United States Patent
Jamrog et al.

(10) Patent No.: US 9,524,320 B2
(45) Date of Patent: *Dec. 20, 2016

(54) COLLECTION AND STORAGE OF A PERSONALIZED, SEARCHABLE, UNSTRUCTURED CORPORA

(71) Applicant: International Business Machines Corporation, Armonk, NY (US)

(72) Inventors: Daniel M. Jamrog, Acton, MA (US); Jason D. LaVoie, Littleton, MA (US); Nicholas W. Orrick, Austin, TX (US); Kristin A. Witherspoon, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/720,865

(22) Filed: May 25, 2015

(65) Prior Publication Data

US 2016/0112391 A1 Apr. 21, 2016

Related U.S. Application Data

(63) Continuation of application No. 14/517,811, filed on Oct. 18, 2014.

(51) Int. Cl.
*G06F 17/30* (2006.01)
*G06F 21/62* (2013.01)
(Continued)

(52) U.S. Cl.
CPC ..... *G06F 17/3053* (2013.01); *G06F 17/30528* (2013.01); *G06F 17/30554* (2013.01);
(Continued)

(58) Field of Classification Search
CPC ................................................ G06F 17/30675
(Continued)

(56) References Cited

U.S. PATENT DOCUMENTS 5,983,214 A 11/1999 Lang et al.
7,765,166 B2 7/2010 Beringer et al.
(Continued)

OTHER PUBLICATIONS

Jamrog et al., "Collection and Storage of a Personalized, Searchable, Unstructured Corpora,", U.S. Appl. No. 14/517,811, filed Oct. 18, 2014, 36 pages.

*Primary Examiner* — Mahesh Dwivedi
(74) *Attorney, Agent, or Firm* — VanLeeuwen & VanLeeuwen; Diana R. Gerhardt (57) ABSTRACT

An approach is provided for utilizing unstructured corpora in a Question and Answer (QA) system. A question is received at the QA system. A private corpora is generated with the private corpora being associated with the user. The private corpora is generated from private data stores associated with the user as well as private data stores associated with other users. Access to the other user's private data sources is provided to the user by the other users. The system retrieves data responsive to the question from the private corpora. The responsive data is ranked based on its relevance to the question. Likely answers are identified based on the ranked responsive data and the likely answers are provided back to the user.

7 Claims, 6 Drawing Sheets (51) Int. Cl.
*G06F 21/31* (2013.01)
*H04L 29/06* (2006.01)

(52) U.S. Cl.
CPC .. *G06F 17/30675* (2013.01); *G06F 17/30696* (2013.01); *G06F 17/30702* (2013.01); *G06F 17/30867* (2013.01); *G06F 21/31* (2013.01); *G06F 21/6227* (2013.01); *H04L 63/08* (2013.01)

(58) Field of Classification Search
USPC .......................................................... 707/705
See application file for complete search history.

(56) References Cited

U.S. PATENT DOCUMENTS

| | | |
|---|---|---|
| 8,015,006 B2 | 9/2011 | Kennewick et al. |
| 8,156,120 B2 | 4/2012 | Brady |
| 8,417,710 B2 | 4/2013 | Drissi et al. |
| 9,342,597 B1* | 5/2016 | Tomkins ............ G06F 17/30861 |
| 2005/0278323 A1 | 12/2005 | Horvitz et al. |
| 2007/0203893 A1 | 8/2007 | Krinsky et al. |
| 2010/0174709 A1* | 7/2010 | Hansen ............... G06F 17/3087 707/728 |
| 2012/0117101 A1* | 5/2012 | Unruh ................. G06F 17/3064 707/765 |
| 2013/0185336 A1 | 7/2013 | Singh et al. |
| 2013/0304455 A1* | 11/2013 | O'Sullivan ........... G06F 17/241 704/9 |
| 2014/0344952 A1* | 11/2014 | Kulick ................ G06F 21/6245 726/28 |
| 2015/0172293 A1* | 6/2015 | Bittner ............... G06F 21/6245 726/4 |

\* cited by examiner

COLLECTION AND STORAGE OF A PERSONALIZED, SEARCHABLE, UNSTRUCTURED CORPORA

BACKGROUND OF THE INVENTION

Many users are interested in smarter systems that help them manage their day-to-day lives in meaningful ways. Devices, such as smart phones, have provided some measure of success in helping users manage their daily lives. The proliferation of both system and network based applications captures a vast array of information pertaining to a user. Most users have data rich, personalized corpora that is separated into different corpora. There are various social media posts, emails, calendar entries stored in the user's smart phones, calendar entries on web sites, and so on. Unfortunately, due to the disparate nature of the corpora, today's systems cannot use the user's personalized corpora in a meaningful way. For example, users are unable to pose deep-analytical questions to a question and answer (QA) system that retrieves answers from the user's personalized corpora.

SUMMARY

An approach is provided for utilizing unstructured corpora in a Question and Answer (QA) system. A question is received at the QA system. A private corpora is generated with the private corpora being associated with the user. The private corpora is generated from private data stores associated with the user as well as private data stores associated with other users. Access to the other user's private data sources is provided to the user by the other users. The system retrieves data responsive to the question from the private corpora. The responsive data is ranked based on its relevance to the question. Likely answers are identified based on the ranked responsive data and the likely answers are provided back to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
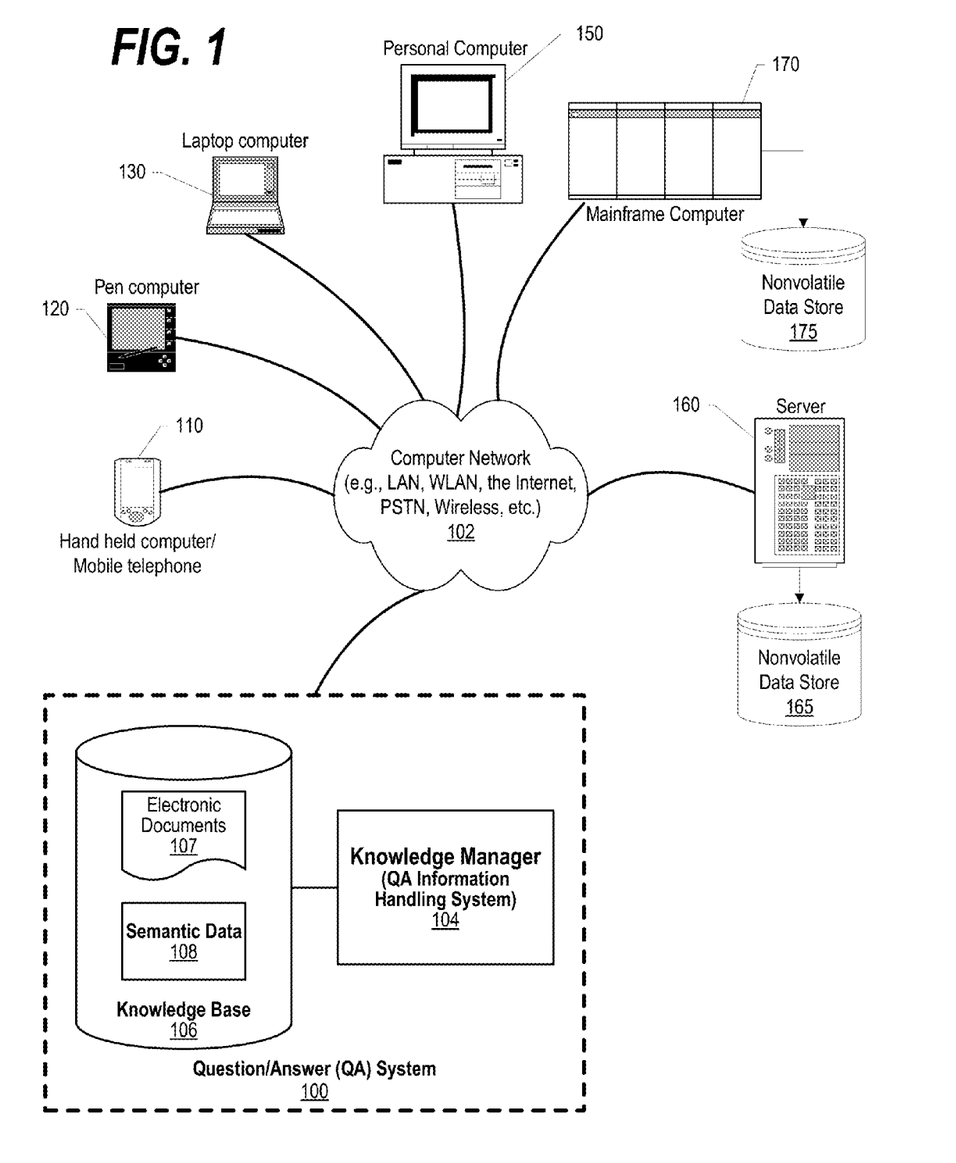
FIG. 1 depicts a network environment that includes a knowledge manager that utilizes a knowledge base.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
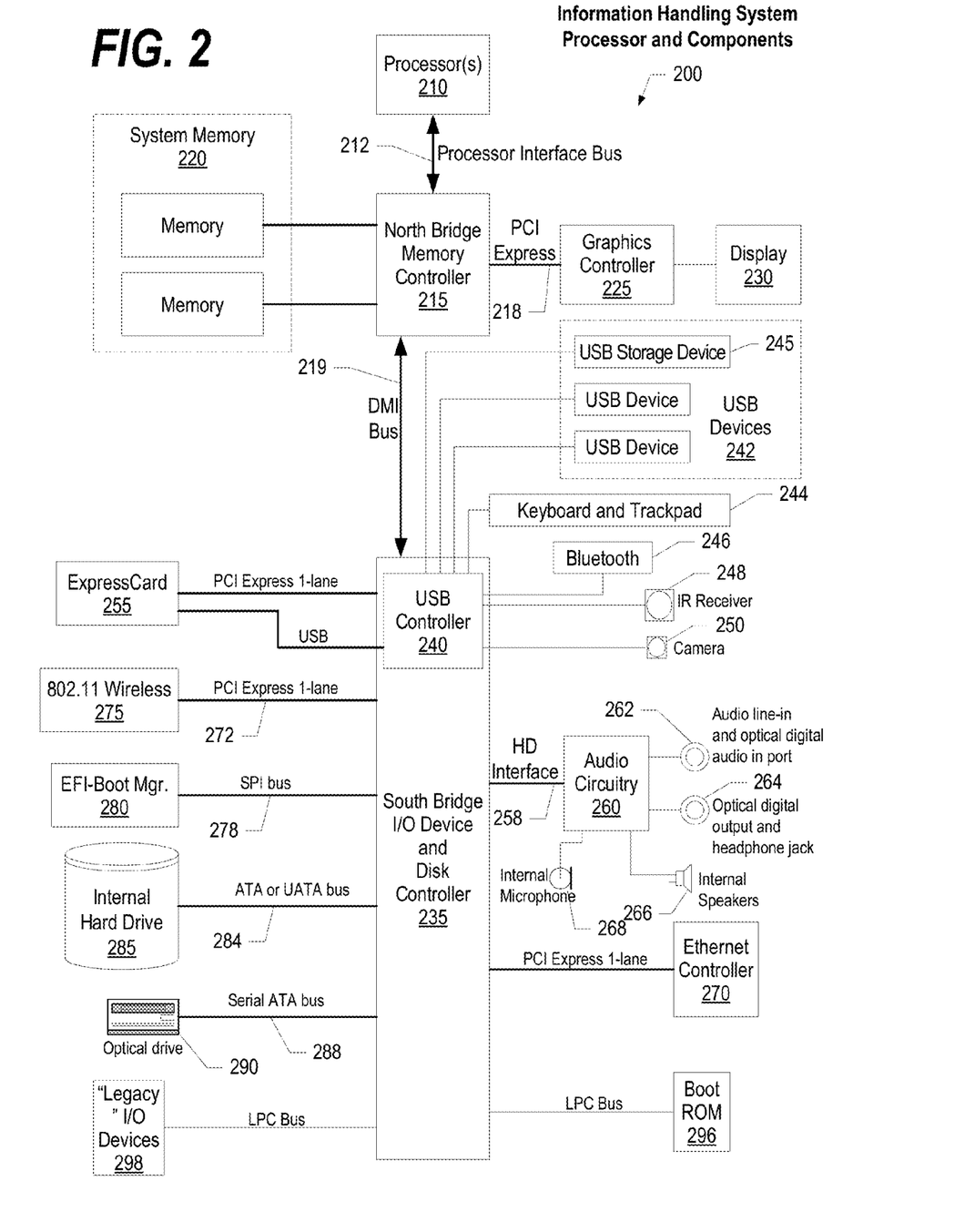
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-6 depict an approach that can be executed on an information handling system, to collect and store personalized, searchable, and unstructured corpora utilized in a Question/Answer (QA) system, such as QA System 100 shown in FIG. 1. In one embodiment, the approach utilizes free indexes available on many system and hooks interfaces, such as social media APIs and live feeds available from some social media sources. The approach builds a searchable structured and unstructured private corpora with a security profile. The approach is able to collect and store a broad range of private corpora that contains multitudes of rich, personalized user data. The deep analytical question and answer system (QA System 100) collects a variety of data that is meaningful to individual users. The QA System creates a collection of personalized unstructured corpora that includes users' emails, calendar entries, social media posts, social media messages, instant messaging chats, text messages, and the like. This private corpora is stored and is searchable by the QA System.

For example, if a user asks, "When am I free for a dinner date?" The QA System can discover free times from unstructured text, such as, "John Doe is free on Feb. 13, 2013." The system scans the unstructured data for key terms like "free," "available," particular dates like "February 13" or "Feb. 13," and can also scan for actual calendar entries in the corpora. The QA System returns relevant answers that include dates that a user is available.

Additionally, the approach refines results and proposes a location based on social media and corpus. For example, when a user asks, "When am I free for a dinner date?" the system might suggest meeting at a particular restaurant in a particular location because, using the private data sources, the system is able to gather location information and restaurant recommendations based on content in the corpus.

The approach combines multiple individuals' private corpora which is made accessible by the QA system so that the system can search across groups of individual users. The data types in a user's private corpora can be restricted using a security profile so that certain types of information are not gathered by the QA System. Users' private data stores are mined for various types of information including the user's favorite restaurants, free time, and travel plans. However, in one embodiment, a user can configure their security profile to restrict access to specific details. For example, a first user might be able to see that another user is not free at a particular time or date, but the first user cannot access the details of what the other user has planned on the particular date and time.

The security profile protects privacy of individual users. During the ingestion process, the approach searches for key items like free time, locations, favorite contacts, and so on and saves this data so that can be queried by the QA System. In one embodiment, the input question is based on an individual private corpora, however the back end corpora changes based on the other individuals involved in the question. The QA System goes out to the back end corpora when doing candidate answer building. In this manner, the approach answers questions with a private corpus that changes based on which user is asking the question, and the other users that are involved in the question.

The following scenario is provided as one example of how the approach is used. An individual private corpora is built for four separate users: Brittney Smith, Katie Smith, Nicole Smith, and Jenny Smith. The private corpora includes social network feeds, messages, and texts, phone data, email, and calendar entries for the four users. All of the individual private corpora is ingested into a QA system in a structured and unstructured format. A first user asks the QA System a question using known natural language processing techniques. In this example, the first user (Brittney Smith) asks, "What is the best date for dinner for me, Katie Smith, Nicole Smith, and Jenny Smith?" The QA System identifies the individual private corpora for each individual identified in the query. In this example, the corpora for the first user (Brittney Smith), Katie Smith, Nicole Smith, and Jenny Smith is gathered and merged together by the QA System. The corpora includes emails, calendars, recent web searches, and social media updates such as social media feeds, social media messages/posts, and social media content. After the private corpora is merged, the QA System processes the unstructured corpora and gathers the next available date based on calendar entries, dates mentioned in emails dates mentioned in social media, and so on. After a date that everyone appears to be free is found, it will determine the location of each individual and make dinner suggestions by searching on restaurant ratings websites such as Yelp or Google. For example, if the location of Katie, Brittney, Nicole, and Jenny is Boston, it will use public corpora to search for restaurants in Boston and recommend a location for the dinner. The system might also provide a list of phone numbers for all recommended restaurants.

As a further scenario, the approach might also be used to determine activities for a particular group of people. For example, the first user (Brittney Smith) poses a question to the QA System of "What is a good get together date for me, Katie Smith, Nicole Smith, and Jenny Smith?" In response, the QA System merges the individual private corpora of Katie, Brittney, Nicole, and Jenny, searches all calendar entries, social media content, and emails for free dates, determines possible dates, searches the corpora again for all the locations of each individual on the possible dates. The system might determine from the sets of private corpora that all four users will be in New York City on a particular date. The system then use the date and location to suggest activities. For example, it might suggest a concert in Bryant Park on February 20th at 2 PM and provide event details, or dinner at Ruby's at Times Square at 6 PM and musical tickets for a Broadway show at 7 PM. The QA System then returns the query results to the first user (e.g., Brittney Smith) who posed the question.

Figure 3:
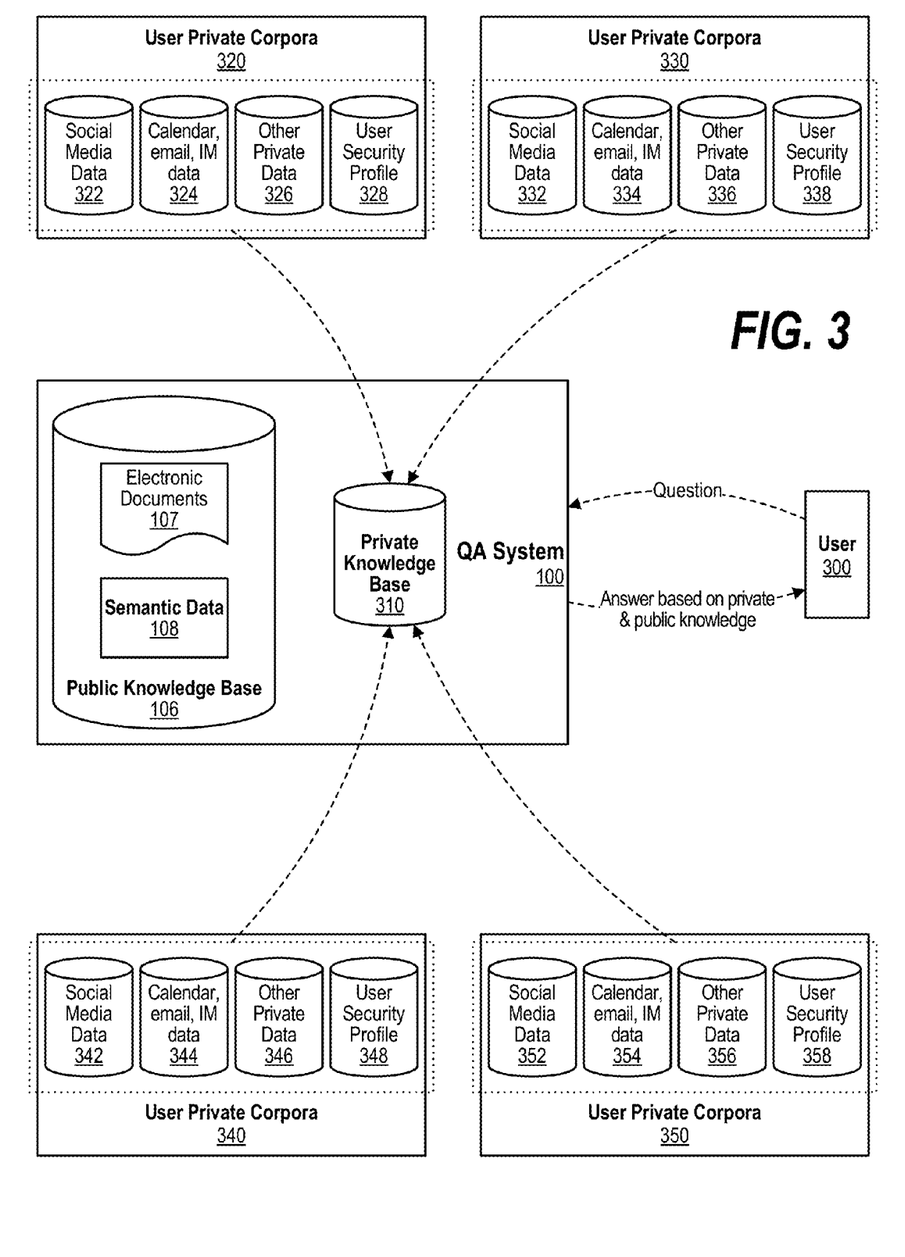
FIG. 3 is a component diagram depicting the various components in collecting and storing personalized, searchable, and unstructured corpora.

FIG. 3 is a component diagram depicting the various components in collecting and storing personalized, searchable, and unstructured corpora. User 300 (first user) is the user that is submitting a question to Question Answering (QA) system 100. QA system 100 has access to public knowledge base 106 as well as to private knowledge base 310. In one embodiment, private knowledge base is gathered based on the secondary users that are implicitly or explicitly referenced in the first user's (user 300's) question.

In the example, four users are referenced by the first user's question as indicated by the four sets of user private corpora. Using the example previously introduced, where the user submitted the question "What is a good get together date for me, Katie Smith, Nicole Smith, and Jenny Smith?", one of the user private corpora (corpora 320) would correspond to the sender of the question ("me"), and the other three user private corpora (corpora 330, 340, and 350) would correspond to the secondary users ("second users") referenced in the question (Katie Smith, Nicole Smith, and Jenny Smith, respectively). Various types of data are included in each of the users' private corpora such as social media data, calendar, email, text messaging data, and other private data. Social media data stores corresponding to the first user ("me") and the three secondary users are shown stored in data stores 322, 332, 342, and 352, respectively. Calendar, email, and text messaging data stores corresponding to the first user and the three secondary users are shown stored in data stores 324, 334, 344, and 354, respectively. Finally, other data stores corresponding to the first user and the three secondary users are shown stored in data stores 326, 336, 346, and 356, respectively.

Each user can have security settings stored in a security profile that control access to the respective users' private data by others as well as the types of data such other users can access. The security profiles that correspond to the first user ("me") and the three secondary users are shown stored in data stores 328, 338, 348, and 358, respectively. For example, one of the secondary users (e.g., Katie Smith, etc.) may allow friends access to her calendar to see when she is busy and where she will be (e.g., city, state, etc.) but not allow her friends to see what specific activity has scheduled for such times. The same user may allow close family members (e.g., spouse, etc.) access and allow such close family members to see the times at which she is busy as well as the specific details regarding the scheduled activities on her calendar.

QA system 100 builds private knowledge base 310 using the private corpora of the users pertaining to the question posed by the first user (corpora 320, 330, 340, and 350). The QA system can utilize data from such private corpora to determine, for example, when the various users can meet and where the users might be located (e.g., city, state, etc.) on a particular date. In addition, QA system 100 can utilize public knowledge base 106 to access at utilize knowledge not included in the private corpora. For example, the QA system might identify that all four users will be in New York City on a particular date and suggest a concert in Bryant Park on February 20th at 2 PM and provide event details, or dinner at Ruby's at Times Square at 6 PM and musical tickets for a Broadway show at 7 PM. The concert and dinner details would be gathered from public sources and retrieved from public knowledge base 106. The QA System returns the query results (the answer, or candidate answers) to the first user (e.g., Brittney Smith) who posed the question.

Figure 4:
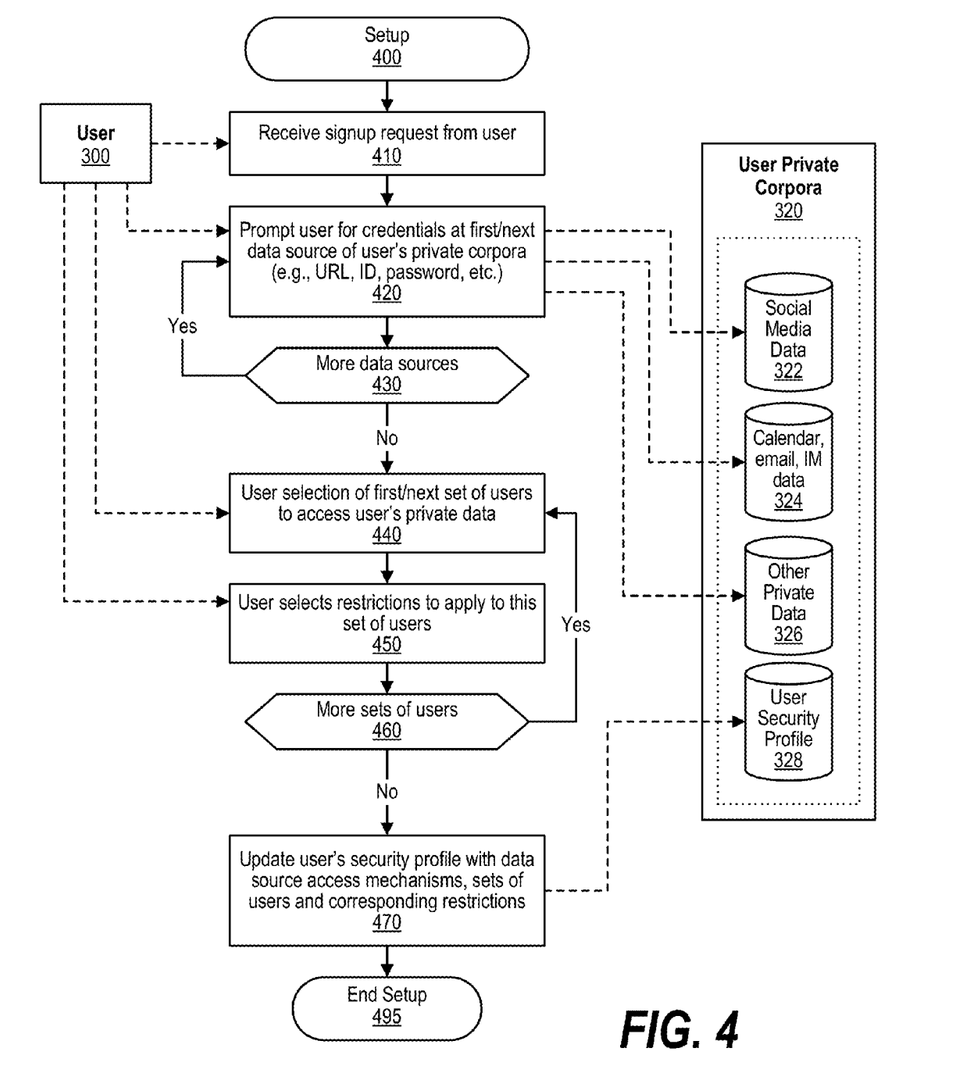
FIG. 4 is a depiction of a flowchart showing the logic used in setting up a user's private corpora for collection and searching by the system.

FIG. 4 is a depiction of a flowchart showing the logic used in setting up a user's private corpora for collection and searching by the system. FIG. 4 commences at 400 and shows the steps taken by a process that performs setup functions where a user provides access to the user's private data stores. At step 410, the process receives a signup request from user 300. At step 420, the process prompts user 300 for credentials pertaining to the first data source of user's private corpora 320. Credentials might include a Uniform Resource Locator (URL) pertaining to the data source, a user identifier used to access the private corpora (e.g., user identifier of user's social media account, etc.), and a password used to access the private corpora. User private corpora includes social media data store 322, calendar, email, instant message data stores 324, and other private data stores 326.

The process determines as to whether there are more private data stores to process (decision 430). If there are more private data stores to process, then decision 430 branches to the 'yes' branch which loops back to process the next private data store pertaining to the user. This looping continues until there are no more private data stores to process, at which point decision 430 branches to the 'no' branch for further setup processing.

At step 440, the process receives the user's selection of a first set of users to whom the user is granting access to the user's private data stores. At step 450, the process receives the user's selection pertaining to any restrictions that are apply to this set of users. For example, if the set of users are friends then the user may allow the set of users access to the user's calendar availability data, but restrict friends from viewing details regarding the user's planned activities on such dates. On the other hand, if the set of users are close family members, then the user may allow such family members access to both the calendar availability data as well as the details of planned activities on such dates.

The process determines as to whether there more sets of users that the user wishes to establish (decision 460). If there are more sets of users, then decision 460 branches to the 'yes' branch which loops back to allow the user to select the next set of users at step 440 as well as restrictions to apply to the set of users at step 450. This looping continues until there are no more sets of users to process, at which point decision 460 branches to the 'no' branch to finalize setup processing. At step 470, the process updates the user's security profile with the private data store access credentials needed to access such private data stores, the sets of users that the user is allowing access to the user's private data stores, and access restrictions established by the user for such sets of users. Step 470 stores private data store identifiers and credentials, sets of users, and restrictions in user security profile 328. FIG. 4 processing thereafter ends at 495.

Figure 5:
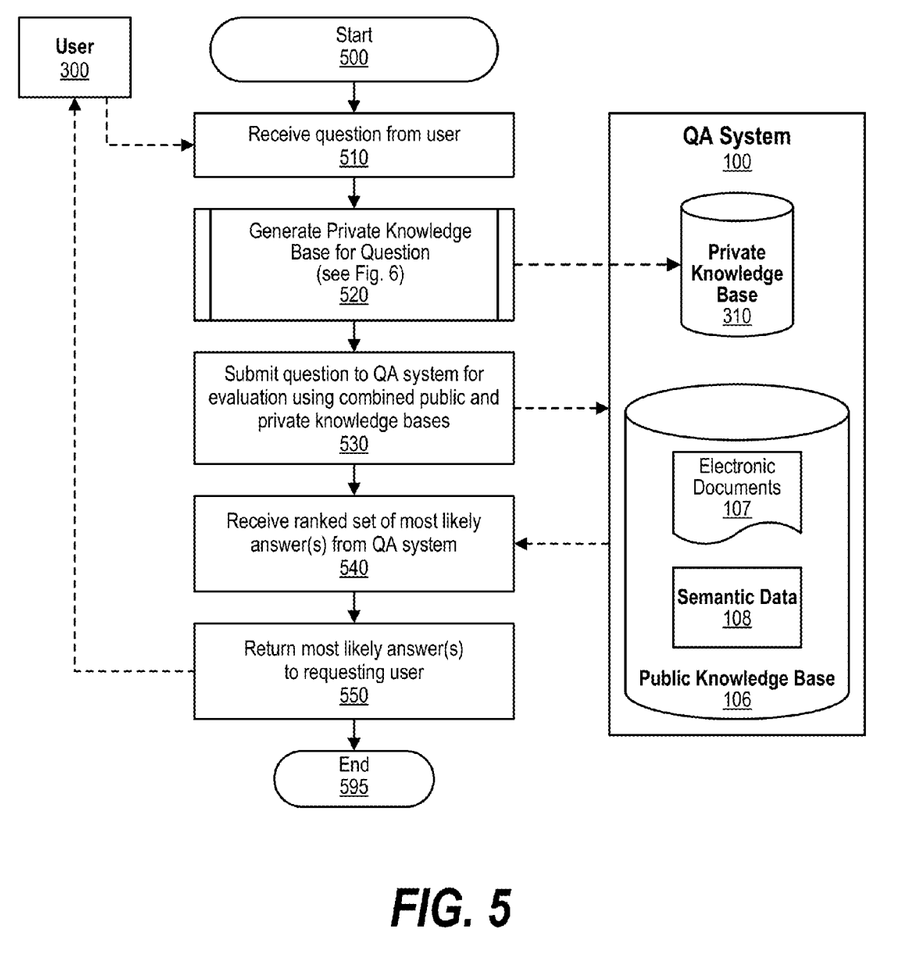
FIG. 5 is a depiction of a flowchart showing the logic performed in answering a user's question utilizing personalized, searchable, and unstructured corpora.

FIG. 5 is a depiction of a flowchart showing the logic performed in answering a user's question utilizing personalized, searchable, and unstructured corpora. FIG. 5 commences at 500 and shows the steps taken by a process that receives a question from a first user that, based on the nature of the question, uses a private corpora to answer the question. At step 510, the process receives the question from user 300. At predefined process 520, the process performs the Generate Private Knowledge Base for Question routine (see FIG. 6 and corresponding text for processing details). The result of predefined process 520 is private corpora 310 that is generated and accessible by QA system 100 to answer the user's question. At step 530, the process submits the question received from the user to QA system 100 for evaluation. QA system retrieves data pertaining to the question from both public corpora 106 and private corpora 310. At step 540, the process receives a ranked set of most likely answer (s) from QA system 100. At step 550, the process returns the most likely answer(s) to requesting user 300. FIG. 5 processing thereafter ends at 595.

Figure 6:
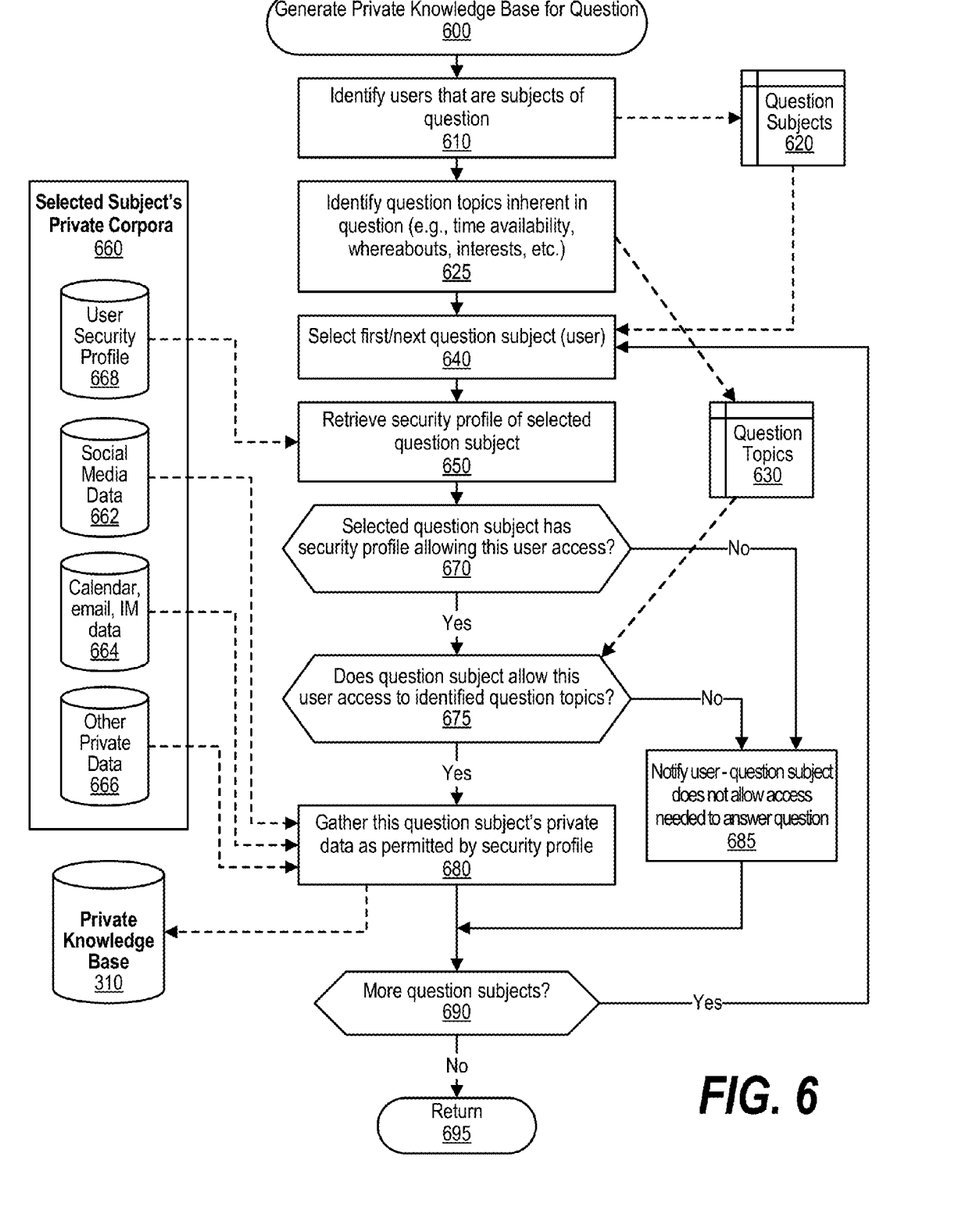
FIG. 6 is a depiction of a flowchart showing the logic used in generating a private knowledge base used by the Question and Answer (QA) system.

FIG. 6 is a depiction of a flowchart showing the logic used in generating a private knowledge base used by the Question and Answer (QA) system. FIG. 6 commences at 600 and shows the steps taken by a process that performs a routine to generate a private knowledge base for a question posed by a first user. At step 610, the process identifies users that are subjects of question (second users) and stores the data in memory area 620. At step 625, the process identifies question topics that are inherent in the question posed by the first user (e.g., time availability, whereabouts, interests, etc.) and the identified question topics are stored in memory area 630.

At step 640, the process selects the first question subject (user) from memory area 620. At step 650, the process retrieves the security profile of the selected question subject from the selected subject's private corpora 660, in particular from user security profile data store 668. The process determines as to whether the selected question subject (secondary user) has established setting in the security profile that allows this user (the first user) access to the secondary user's private corpora (decision 670). If selected question subject has a security profile allowing this user access to the secondary user's private corpora, then decision 670 branches to the 'yes' branch whereupon the process determines whether the question subject (secondary user) has established settings in his or her security profile that also allow this user (the first user) access to the identified question topics that were previously identified and stored in memory area 630 (decision 675).

If the secondary user has a security profile with settings that allow this user (the first user) access to the identified question topics, then decision 675 branches to the 'yes' branch for further processing. If the secondary user's security profile 668 has settings that permit the first user access to the secondary user's private corpora as well as the type of data needed to answer the question, then, at step 680, the process gathers the secondary user's private data as permitted by settings established in security profile 668. The private data is gathered from social media data data store 662, calendar, email, text messaging data store 664, and other private data stores 666. Step 680 also stores the gathered private data in private knowledge base data store 310 for eventual use by the QA system.

Returning to decisions 670 and 675, if either the settings in the security profile of the secondary user do not allow the first user access to the secondary user's private corpora (decision 670 branching to the 'no' branch) or the security profile settings do not allow the first user access to one or more of the identified question topics (decision 675 branching to the 'no' branch), then, at step 885, the process notifies the first user that the question subject (secondary user) does not permit this user access to data needed to answer the question.

The process determines as to whether there are more question subjects, also called secondary users (decision 690). If there are more question subjects to process, then decision 690 branches to the 'yes' branch which loops back to step 640 to select and process the private data corresponding to the next question subject (secondary user). This looping continues until there are no more question subjects (secondary users) to process, at which point decision 690 branches to the 'no' branch and processing returns to the calling routine (see FIG. 5) at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of utilizing unstructured corpora, the method comprising:
   receiving, from a first user, a question at a question answering (QA) system;
   identifying a set of one or more second users that are subjects of the question;
   generating a private corpora associated with the first user, wherein the private corpora is generated from a first set of one or more private data stores associated with a first user and a second set of one or more private data stores associated with the set of one or more second users, wherein access to the second set of private data stores is provided to the first user by the set of second users;
   retrieving responsive data to the question from the private corpora, wherein the responsive data is ranked based on a relevance to the question;
   identifying one or more likely answers based on the ranked responsive data; and
   providing the one or more likely answers to the first user.

2. The method of claim 1 further comprising:
   prior to receiving the question:
      receiving a set of access credentials from the first user and the set of second users, wherein the access credentials are used to access the first and second sets of private stores; and
      utilizing the set of access credentials to access the first and second sets of private data stores during the generation of the private corpora.

3. The method of claim 1 further comprising:
   receiving one or more access restrictions from a selected one of the set of second users, wherein the access restrictions prevent the first user from accessing one or more types of data from the selected second user's private data stores.

4. The method of claim 1 further comprising:
   creating a security profile associated with a selected one of the set of the second users, wherein the security profile restricts access by the first user to one or more types of data from the selected second user's private data sources; and
   inhibiting inclusion in the responsive data of the one or more types of data from the selected second user's private data sources.

5. The method of claim 4 further comprising:
   determining that the question is unanswerable due to the security profile restricting access to the type of data required by the question; and
   informing the first user that the question is unanswerable due to the security profile.

6. The method of claim 1 wherein at least one of the first and second sets of private data stores is selected from the group consisting of a social media data store, a calendar data store, an email data store, and an instant message data store.

7. The method of claim 1 further comprising:
   retrieving the responsive data to the question from the private corpora and a public corpora.

* * * * *